US010064254B1

(12) United States Patent
Zhang (10) Patent No.: US 10,064,254 B1
(45) Date of Patent: Aug. 28, 2018

(54) MULTI-PHASE POWER SUPPLIES FOR LIGHT FIXTURES (71) Applicant: Cooper Technologies Company, Houston, TX (US)

(72) Inventor: Hui Zhang, Manlius, NY (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 15/611,166

(22) Filed: Jun. 1, 2017

(51) Int. Cl.
H05B 37/02 (2006.01)
H02M 1/084 (2006.01)
H05B 33/08 (2006.01)
H02M 1/14 (2006.01)
H02M 1/00 (2006.01)

(52) U.S. Cl.
CPC ........ *H05B 37/0209* (2013.01); *H02M 1/084* (2013.01); *H02M 1/14* (2013.01); *H05B 33/0815* (2013.01); *H02M 2001/0009* (2013.01)

(58) Field of Classification Search
CPC ............. G09G 3/22; G09G 2320/0233; H05B 37/0272; H05B 41/00; H05B 41/36; H05B 41/28; H05B 41/295; H05B 41/2827; H05B 41/3925; H05B 33/0815; H05B 33/0818; H05B 41/2828; H05B 41/3921; H05B 41/3927; H05B 37/029; H05B 37/0254; H05B 33/0827; H05B 37/02; H05B 33/0803; H05B 33/0809; H05B 33/0821; Y02B 20/202; F21Y 2101/02
See application file for complete search history.

(56) References Cited

U.S. PATENT DOCUMENTS

| 6,650,556 | B2 | 11/2003 | Dinh et al. |
| 9,237,623 | B1* | 1/2016 | Lewis ................ H05B 33/0815 |
| 2011/0057724 | A1* | 3/2011 | Pabon .................... H02M 7/219 |
| | | | 327/581 |
| 2012/0187847 | A1 | 7/2012 | Hamamoto et al. |
| 2013/0063042 | A1 | 3/2013 | Bora et al. |
| 2016/0342128 | A1* | 11/2016 | Yamamoto ................ H02J 7/34 |

FOREIGN PATENT DOCUMENTS

GB    2499220    8/2013

OTHER PUBLICATIONS

A. Golovchenko, International Search Report and Written Opinion issued in application No. PCT/US2017/035438, dated Feb. 20, 2018, dated Apr. 12, 2018, 8 pages, Federal Institute of Industrial Property, Moscow, Russia.

* cited by examiner

Primary Examiner — Minh D A
(74) Attorney, Agent, or Firm — King & Spalding LLP (57) ABSTRACT An electrical system can include a power supply coupled to an electrical load, where the power supply includes an AC/DC converter and a number of DC/DC converters, where the AC/DC converter provides raw DC power to the DC/DC converters, where the DC/DC converters receive the raw DC power and generate final DC power for the electrical load. The electrical system can also include a controller coupled to the power supply, where the controller selectively enables and disables the DC/DC converters.

20 Claims, 7 Drawing Sheets

FIG. 6D

MULTI-PHASE POWER SUPPLIES FOR LIGHT FIXTURES

TECHNICAL FIELD

The present disclosure relates generally to power supplies for light fixtures, and more particularly to systems, methods, and devices for multi-phase power supplies for light fixtures.

BACKGROUND

Light fixtures are used in a variety of environments. Many of these light fixtures use advanced technology with a number of components. As a result, these light fixtures can have a number of failure points. In certain lighting applications, such as lighting systems used in hazardous environments, reliability of the lighting system is vital. Unfortunately, the characteristics (e.g., humidity, extreme temperatures, corrosive gas) of these environments can cause the failure of one or more components of a light fixture to be accelerated.

SUMMARY

In general, in one aspect, the disclosure relates to an electrical system that includes a power supply coupled to an electrical load, where the power supply includes an AC/DC converter and multiple DC/DC converters, where the AC/DC converter provides raw DC power to the DC/DC converters, where the plurality of DC/DC converters receive the raw DC power and generate final DC power for the electrical load. The electrical system can also include a controller coupled to the power supply, where the controller selectively enables and disables the plurality of DC/DC converters over time.

In another aspect, the disclosure can generally relate to a power supply for an electrical load. The power supply can include an AC/DC converter that receives AC power from a power source and converts the AC power to raw DC power. The power supply can also include at least one switch coupled to the AC/DC converter, where the at least one switch is operated by a controller, and where the at least one switch has multiple configurations. The power supply can further include multiple DC/DC converters coupled to the switch and to the electrical load.

In yet another aspect, the disclosure can generally relate to a method for providing DC power to an electrical load. The method can include receiving, by an AC/DC converter, AC power from a power source. The method can also include operating, by a controller at a first time, at least one switch to a first configuration, where the at least one switch is coupled to the AC/DC converter and to multiple DC/DC converters, where the first configuration of the at least one switch delivers raw DC power from the AC/DC converter to a first subset of DC/DC converters among the multiple DC/DC converters at the first time period, where the first subset of DC/DC converters deliver first final DC power to the electrical load. The method can further include operating, by the controller at a second time, the at least one switch to a second configuration, where the second configuration of the at least one switch delivers raw DC power from the AC/DC converter to a second subset of DC/DC converters among the multiple DC/DC converters at the first time period, where the second subset of DC/DC converters deliver second final DC power to the electrical load.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

In general, example embodiments provide systems, methods, and devices for multi-phase power supplies for light fixtures. Example multi-phase power supplies for light fixtures provide a number of benefits. Such benefits can include, but are not limited to, preventing abrupt failure of light fixtures in critical applications, longer useful life of light fixtures (and power supplies in particular), enabling preventative maintenance practices, more consistent light output of light fixtures, reducing operating costs, and compliance with industry standards that apply to light fixtures located in certain environments.

While example embodiments are directed to LED drivers, any type of power supply for a light fixture can be utilized in example embodiments. An example of another power supply can include, but is not limited to, a ballast. Further, while example embodiments are directed herein to lighting loads that use light-emitting diode (LED) technology, example embodiments can also be directed to other types of lighting technology. Examples of such other lighting technologies can include, but are not limited to, fluorescent, sodium vapor, halogen, incandescent, and mercury vapor. When example embodiments are directed to LED technology, one or more of any type of LED technology can be included, such as chip-on-board, discrete, arrays, and multicolor.

Even more generally, while example embodiments described herein are directed to lighting systems, other types of electrical systems that utilize one or more power supplies with multiple means of output that are switchable can be used with example embodiments. Examples of such other electrical systems can include, but are not limited to, computer systems, a system of appliances, an assembly system, a security system, and an audio/visual system.

Example embodiments can be used during an adverse operating condition (e.g., a fault). In this way, one or more light loads can continue to receive power and operate during the adverse operating condition. In addition, or in the alternative, example embodiments can be used during normal operating conditions. In this way, example embodiments can be used to increase reliability and useful life of one or more power supplies that provide power to one or more light loads by cycling the power supplies based on one or more factors (e.g., an amount of time, a number of consecutive operating hours).

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. The example light fixtures having multi-phase power supplies (or components thereof, including controllers) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures (or portions thereof) having multi-phase power supplies described herein can be made from a single piece (as from a mold, injection mold, die cast, or extrusion process). In addition, or in the alternative, example light fixtures (or portions thereof) having multi-phase power supplies can be made from multiple pieces that are mechanically and/or electrically (e.g., wired, inductively) coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of multi-phase power supplies for light fixtures, one or more of the components shown may be omitted, repeated, and/or substituted. Accordingly, example embodiments of multi-phase power supplies for light fixtures should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

While example embodiments described herein are directed to a light load within one or more light fixtures, multi-phase power supplies can also be applied to any other devices and/or components disposed within an electrical enclosure. As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a driver, a ballast), a battery, a sensor module, a safety barrier, a sensor, sensor circuitry, a light source, electrical cables, and electrical conductors. Examples of an electrical enclosure can include, but are not limited to, a housing for a light fixture, a junction box, a motor control center, a breaker box, an electrical housing, a conduit, a control panel, an indicating panel, and a control cabinet.

In certain example embodiments, light fixtures having multi-phase power supplies are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

Example embodiments of multi-phase power supplies for light fixtures will be described more fully hereinafter with reference to the accompanying drawings, in which example embodiments of multi-phase power supplies for light fixtures are shown. Multi-phase power supplies for light fixtures may, however, be embodied in many different forms and should not be construed as limited to the example embodiments set forth herein. Rather, these example embodiments are provided so that this disclosure will be thorough and complete, and will fully convey the scope of multi-phase power supplies for light fixtures to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation, and are not meant to limit embodiments of multi-phase power supplies for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1A:
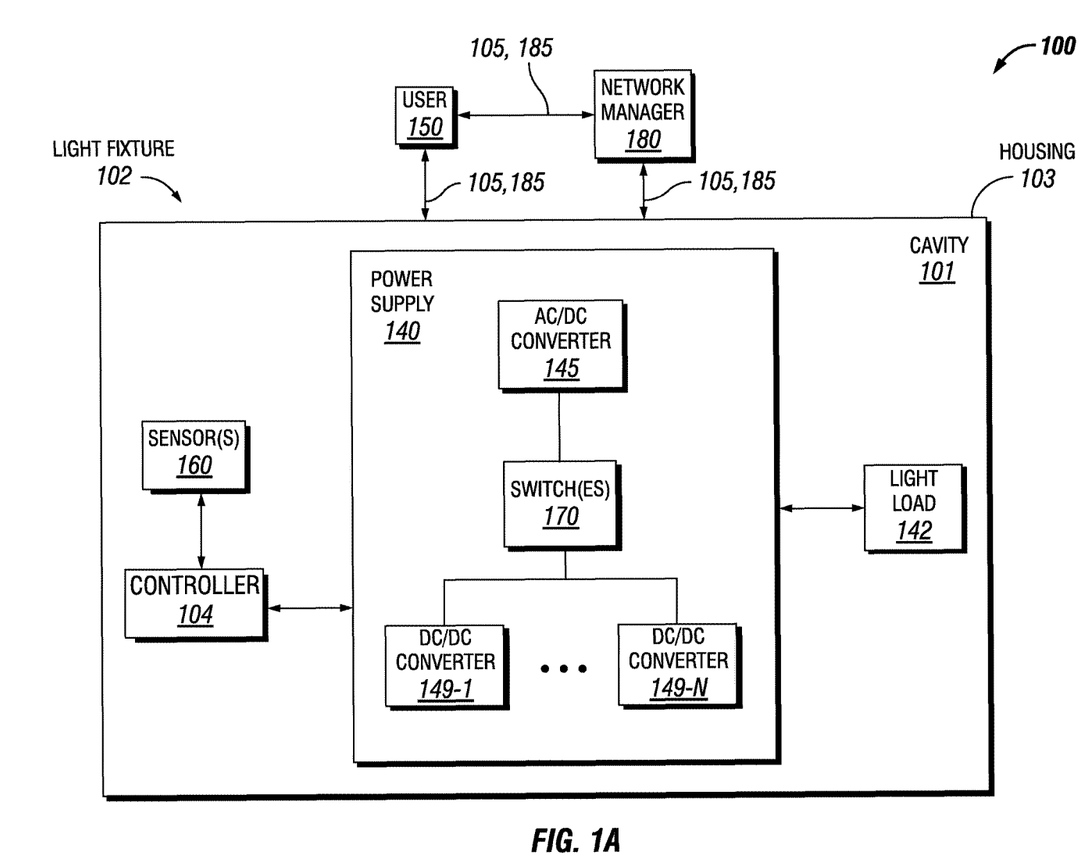
FIGS. 1A and 1B show a system diagram of a lighting system that includes a light fixture in accordance with certain example embodiments.
Figure 1B:
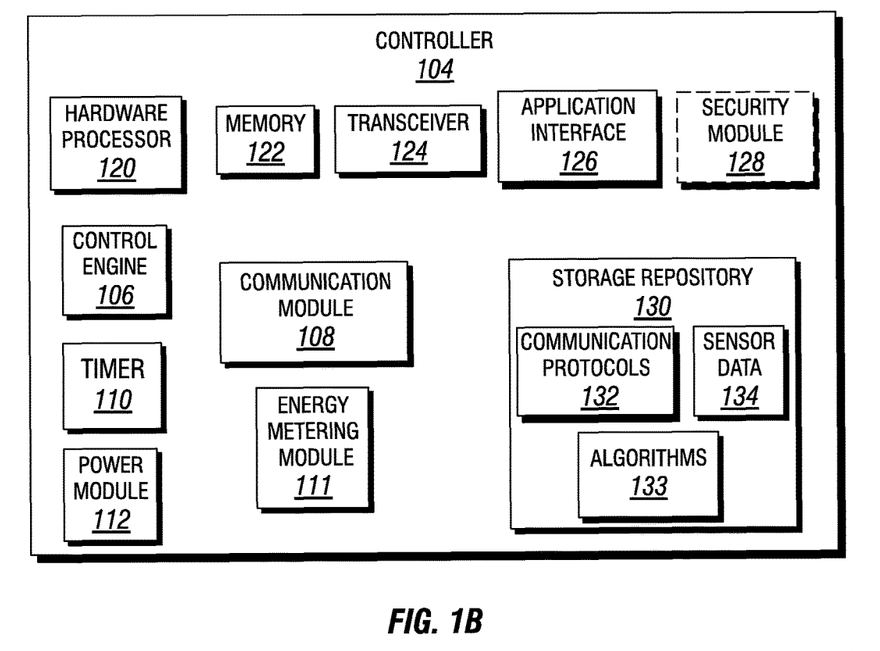

FIGS. 1A and 1B show a system diagram of a lighting system 100 that includes multi-phase power supplies of a light fixture 102 in accordance with certain example embodiments. Specifically, FIG. 1A shows the lighting system 100, and FIG. 1B shows a detailed system diagram of a controller 104. As shown in FIGS. 1A and 1B, the lighting system 100 can include one or more sensors 160 (also sometimes called sensor modules 160), a user 150, a network manager 180, and at least one light fixture 102. In addition to the controller 104 and the sensors 160, the light fixture 102 can include a power supply 140, one or more switches 170, and a light load 142. The power supply 140 can include an alternating current (AC)-to-direct current (DC) converter 145 (also called, for example, an AC/DC converter) coupled to one side of the switches 170 and multiple DC/DC converters 149 (also called, for example, DC/DC converters 149) (e.g., DC/DC converter 149-1, DC/DC converter 149-N) coupled to the other side of the switches 170.

As shown in FIG. 1B, the controller 104 can include one or more of a number of components. Such components, can include, but are not limited to, a control engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example light fixture. Further, one or more components shown in FIGS. 1A and 1B can be rearranged. For example, one or more of the switches 170 can be part of the controller 104 of FIG. 1B. Any component of the example light fixture 102 can be discrete or combined with one or more other components of the light fixture 102.

A user 150 may be any person that interacts with light fixtures or other devices that use example power supplies. Examples of a user 150 may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensors 160. Interaction between the user 150 and the light fixture 102, the network manager 180, and the sensors 160 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a signal transfer link 105 can be (or include) one or more electrical conductors that are coupled to the housing 103 of the light fixture 102 and to a sensor 160. A signal transfer link 105 can transmit signals (e.g., communication signals, control signals, data) between the light fixture 102 and the user 150, the network manager 180, and/or one or more of the sensors 160. Similarly, a power transfer link 185 can transmit power between the light fixture 102 and the user 150, the network manager 180, and/or one or more of the sensors 160. One or more signal transfer links 105 and/or one or more power transfer links 185 can also transmit signals and power, respectively, between components (e.g., controller 104, sensor 160, switch 170) within the housing 103 of the light fixture 102.

The network manager 180 is a device or component that can communicate with the light fixture 102. For example, the network manager 180 can send instructions to the controller 104 of the light fixture 102 as to when certain switches 170 should be operated (change state). As another example, the network manager 180 can receive data (e.g., run time, current flow) associated with the operation of each power supply 140 from the light fixture 102 to determine when maintenance should be performed on the light fixture 102 or portions thereof.

The one or more sensors 160 can be any type of sensing device that measure one or more parameters. Examples of types of sensors 160 can include, but are not limited to, a resistor, a Hall Effect current sensor, a thermistor, a vibration sensor, an accelerometer, a passive infrared sensor, a photocell, and a resistance temperature detector. A parameter that can be measured by a sensor 160 can include, but is not limited to, current, voltage, power, resistance, vibration, position, and temperature. In some cases, the parameter or parameters measured by a sensor 160 can be used to operate one or more light loads 142 of the light fixture 102. Each sensor 160 can use one or more of a number of communication protocols. A sensor 160 can be associated with the light fixture 102 or another light fixture in the system 100. A sensor 160 can be located within the housing 103 of the light fixture 102 (as shown in FIG. 1A), disposed on the housing 103 of the light fixture 102, or located outside the housing 103 of the light fixture 102.

The user 150, the network manager 180, and/or the sensors 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, and/or each sensor 160. The user 150, the network manager 180, and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

The housing 103 of the light fixture 102 can be used to house one or more components of the light fixture 102, including one or more components of the controller 104. For example, as shown in FIGS. 1A and 1B, the controller 104 (which in this case includes the control engine 106, the communication module 108, the timer 110, the energy metering module 111, the power module 112, the storage repository 130, the hardware processor 120, the memory 122, the transceiver 124, the application interface 126, and the optional security module 128), the power supply 140, and the light loads 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more sensors 160 within the system 100. In one or more example embodiments, the storage repository 130 stores one or more protocols 132, algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols 132 that are used to send and/or receive data between the controller 104 and one or more components within and/or outside the system 100. For example, one or more protocols 132 can be a process or procedure by which the controller 104 (or portions thereof) operates under a given set of conditions (e.g., time, readings by sensors 160, measurements by energy metering module 111).

A protocol 132 can be used for wired and/or wireless communication. Examples of a protocol 132 can include, but are not limited to, Modbus, profibus, Ethernet, and fiberoptic. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any formulas, logic steps, mathematical models, and/or other suitable means of manipulating and/or processing data. For example, the controller 104 can use the algorithms 133 and the protocols 132 to measure (using the energy metering module 111) one or more parameters (e.g., current, temperature, voltage) of a DC/DC converter 149 (as measured by one or more sensors 160), store (as stored data 134 in the storage repository 130) the resulting measurements, and evaluate the stored data 134 using one or more of the algorithms 133. As another example, an algorithm 133 can measure (using the energy metering module 111), storing (using the stored data 134 in the storage repository 130), and evaluate the current and voltage delivered to and delivered by the AC/DC converter 145 of the power supply 140 to a particular DC/DC converter 149 of the power supply 140 over time.

As yet another example, an algorithm 133 can be directed to continuously monitor the current (as measured by the energy metering module 111 and stored as stored data 134) output by each DC/DC converter 149. As another example, an algorithm 133 can be directed to analyzing the current output of the AC/DC converter 145 of the power supply 140 over time. If a current output exceeds a threshold value, then one or more switches 170 can change state (by the control engine 106) to change the current output of one or more DC/DC converters 149 of the power supply 140. Alternatively, a protocol 132 can be used to operate one or more of the switches 170 based on some other factor, including but not limited to a passage of time.

Stored data 134 can be any data associated with the light fixture 102 (including other light fixtures and/or any components thereof), any measurements taken by the sensors 160, measurements taken by the energy metering module 111, time measured by the timer 110, threshold values, current ratings for the power supply 140, results of previously run or calculated algorithms, and/or any other suitable data. Such data can be any type of data, including but not limited to historical data for the light fixture 102 (including any components thereof, such as the power supply 140 and the light load 142), historical data for other light fixtures, calculations, measurements taken by the energy metering module 111, and measurements taken by one or more sensors 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, and the sensors 160 in the system 100. More specifically, the control engine 106 sends information to and/or receives information from the storage repository 130 in order to communicate with the user 150, the network manager 180, and the sensors 160. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., switches 170, a sensor 160, the user 150) in the system 100.

As another example, the control engine 106 can acquire the current time using the timer 110. The timer 110 can enable the controller 104 to control the light fixture 102 (including any components thereof, such as one or more power supplies 140 and one or more switches 170) even when the controller 104 has no communication with the network manager 180. As yet another example, the control engine 106 can direct the energy metering module 111 to measure and send power consumption information of a power supply 140 to the network manager 180. In some cases, the control engine 106 of the controller 104 can control the position (e.g., open, closed) of each switch 170, which causes a particular DC/DC converter 149 of the power supply 140 to provide power to the light load 142.

The control engine 106 can be configured to perform a number of functions that control which DC/DC converter 149 of the power supply 140 provides power to the light load 142 of the light fixture 102. Specifically, the control engine 106 can control the position (also called a configuration herein) of each of the switches 170, thereby controlling which one or more DC/DC converters 149 of the power supply 140 provides power to the light load 142 at a particular point in time. The one or more DC/DC converters 149 that deliver, based on the configuration of the switches 170 at a given point in time, final DC power to the light load 142 can be called a subset of DC/DC converters 149 from among all of the DC/DC converters 149.

For example, the control engine 106 can execute any of the protocols 132 and/or algorithms 133 stored in the storage repository 130 and use the results of those protocols and/or algorithms 133 to change the position of one or more switches 170. As a specific example, the control engine 106 can measure (using the energy metering module 111), store (as stored data 134 in the storage repository 130), and evaluate, using an algorithm 133, the current and voltage delivered by each DC/DC converter 149 of the power supply 140 to light load 142 over time. In this way, the operation of each DC/DC converter 149 of the power supply 140 can be optimized to increase the reliability of the power supply 140. As another specific example, the control engine 106 can determine, based on measurements made by the energy metering module 111, whether a particular DC/DC converter 149 of the power supply 140 has failed. In such a case, the control engine 106 can change the position of one or more switches 170 to have another DC/DC converter 149 of the power supply 140 provide power to the light load 142 that was receiving power from the DC/DC converter 149 of the power supply 140 that failed.

The control engine 106 can generate an alarm when an operating parameter (e.g., total number of operating hours, number of consecutive operating hours, number of operating hours delivering power above a current level, input power quality, vibration, operating ambient temperature, operating device temperature, and cleanliness (e.g., air quality, fixture cleanliness)) of the power supply 140 (or component thereof) exceeds a threshold value, indicating possible present or future failure of the power supply 140 (or component thereof). The control engine 106 can further measure (using one or more sensors 160) and analyze the magnitude and number of surges that the power supply 140 is subjected to over time.

Using one or more algorithms 133, the control engine 106 can predict the expected useful life of the power supply 140 (or a particular component thereof) based on stored data 134, a protocol, one or more threshold values, and/or some other factor. The control engine 106 can also measure (using one or more sensors 160) and analyze the efficiency of the power supply 140 (or component thereof) over time. An alarm can be generated by the control engine 106 when the efficiency of the power supply 140 (or component thereof) falls below a threshold value, indicating failure of the power supply 140 (or component thereof).

The control engine 106 can provide power, control, communication, and/or other similar signals to the user 150, the network manager 180, and one or more of the sensors 160. Similarly, the control engine 106 can receive power, control, communication, and/or other similar signals from the user 150, the network manager 180, and one or more of the sensors 160. The control engine 106 can control each sensor 160 automatically (for example, based on one or more algorithms stored in the control engine 106) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components of a system external to the system 100 in furtherance of optimizing the performance of the power supply 140 of the light fixture 102. For example, the control engine 106 can interact with an inventory management system by ordering a component (e.g., a DC/DC converter 149) of the power supply to replace a component of the power supply 140 of the light fixture 102 that the control engine 106 has determined to fail or be failing. As another example, the control engine 106 can interact with a workforce scheduling system by scheduling a maintenance crew to repair or replace the power supply 140 (or component thereof) of the light fixture 102 when the control engine 106 determines that the power supply 140 (or component thereof) requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a power supply 140, a switch 170) of the light fixture 102. For example, if a power supply 140 of the light fixture 102 operates under IEC Standard 62386, then the power supply 140 can have a serial communication interface that will transfer data (e.g., stored data 134) measured by the sensors 160. In such a case, the control engine 106 can also include a serial interface to enable communication with the power supply 140 within the light fixture 102. Such an interface can operate in conjunction with, or independently of, the protocols 132 used to communicate between the controller 104 and the user 150, the network manager 180, and the sensors 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, and/or one or more of the sensors 160. In some cases, the communication module 108 accesses the stored data 134 to determine which communication protocol is used to communicate with the sensor 160 associated with the stored data 134. In addition, the communication module 108 can interpret the communication protocol of a communication received by the controller 104 so that the control engine 106 can interpret the communication.

The communication module 108 can send and receive data between the network manager 180, the sensors 160, and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between one or more sensors 160 and the network manager 180 or a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points (e.g., output of each DC/DC converter 149 of the power supply 140) associated with the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor.

The power module 112 of the controller 104 provides power to one or more other components (e.g., timer 110, control engine 106) of the controller 104. In addition, in certain example embodiments, the power module 112 can provide power to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from a source external to the light fixture 102 and generates power of a type (e.g., AC, DC) and level (e.g., 12V, 24V, 120V) that can be used by the other components of the controller 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensors 160. In such a case, the control engine 106 can direct the power generated by the power module 112 to the sensors 160 and/or the power supply 140 of the light fixture 102. In this way, power can be conserved by sending power to the sensors 160 and/or the power supply 140 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBT), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, and/or the sensors 160. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, and/or the sensors 160 can be part of the stored data 134 (or similar areas) of the storage repository 130.

Optionally, in one or more example embodiments, the security module 128 secures interactions between the controller 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the controller 104 and/or the sensors 160. Further, the security module 128 can restrict receipt of information, requests for information, and/or access to information in some example embodiments.

As mentioned above, aside from the controller 104 and its components, the light fixture 102 can include the sensors 160, the light load 142, and the power supply 140, where the power supply 140 includes one or more AC/DC converters 145, one or more switches 170, and multiple DC/DC converters 149. The light load 142 of the light fixture 102 can include devices and/or components typically found in a light fixture to allow the light fixture 102 to operate. The light fixture 102 can have one or more of any number and/or type of light load 142. Examples of such a light load 142 can include, but are not limited to, a local control module, a light engine, a heat sink, an electrical conductor or electrical cable, a light array, a terminal block, a lens, a diffuser, a reflector, an air moving device, a baffle, a dimmer, and a circuit board. The light load 142 can use any type of lighting technology, including but not limited to LED, incandescent, sodium vapor, and fluorescent.

The power supply 140 of the light fixture 102 provides power to the light load 142. The power supply 140 can be called by any of a number of other names, including but not limited to a driver, a LED driver, and a ballast. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

A power supply 140 can include one or more components (e.g., a transformer, a diode bridge, an inverter, a converter) that receives power (for example, through an electrical cable) from the power module 112 of the controller 104 and generates power of a type (e.g., AC, DC) and level (e.g., 12V, 24V, 120V) that can be used by the light load 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

As explained above, the power supply 140 includes an AC/DC converter 145 and multiple DC/DC converters 149. the AC/DC converter 145 receives AC power and converts the AC power to raw DC power. The AC/DC converter 145 sends the raw DC power to one or more of the DC/DC converters 149. When a DC/DC converter 149 receives the raw DC power from the AC/DC converter 145, the DC/DC converter 149 converts the raw DC power to final DC power, which is used by the light load 142.

The multiple DC/DC converters 149 can be located in the same housing 103 or in multiple housings of the power supply 140. In certain example embodiments, each DC/DC converter 149 of the power supply 140 can be individually replaceable (modular) without having to replace the entire power supply 140. In addition, or in the alternative, one or more of the DC/DC converters 149 can be a stand-alone device. The power supply 140 can have one or more output channels, where each output channel is coupled to the light load 142 to provide power to the light load 142. Similarly, the power supply 140 can have one or more input channels, where each input channel is coupled to one or more sources of power (e.g., power module 112) to receive power from such one or more sources of power.

As shown in FIG. 1A, each DC/DC converter 149 of the power supply 140 can be coupled to the light load 142 to deliver final DC power. The switches 170 determine which DC/DC converter 149 is coupled to the light load 142 at any particular point in time. A switch 170 has an open state and a closed state (position). In the open state, the switch 170 creates an open circuit, which prevents the DC/DC converter 149 from delivering power to the light load 142. In the closed state, the switch 170 creates a closed circuit, which allows the DC/DC converter 149 to deliver power to the light load 142. In certain example embodiments, the position of each switch 170 is controlled by the control engine 106 of the controller 104.

Each DC/DC converter 149 can have a rated capacity (e.g., 25 W). In such a case, the controller 104 knows both the rated capacity of each DC/DC converter 149 as well as the actual amount of power consumed by the light load 142 served by that particular DC/DC converter 149. In this way, if one DC/DC converter 149 is failing or has failed, the controller 104 can identify the failed or failing DC/DC converter 149 and determine how to configure each of the switches 170 based, at least in part, on the rated capacity of one or more of the other DC/DC converters 149 relative to the amount of actual power provided by the DC/DC converters 149 before switching. In addition, the controller 104 can also adjust the output of one or more DC/DC converters 149 to avoid or minimize the amount of reduced output of the light load 142.

For example, if there are 4 DC/DC converters 149 each rated for 25 W, but each providing 20 W of power to the light load 142, and if one of the DC/DC converters 149 has failed, the controller 104 can configure the switches 170 so that the three remaining DC/DC converters 149 serve the light load 142. Further, the controller 104 can adjust the output of the three remaining DC/DC converters 149 to their rated capacity of 25 W so that the light load 142 receives only a total of 5 fewer watts.

If, as another example, the rated capacity of each DC/DC converter 149 is 35 W, the controller could adjust the output of the three DC/DC converters 149 to approximately 27 W, and there would be no reduction in power provided to the light load 142 as a result of removing one DC/DC converter 149 from the circuit. These adjustments by the controller in the output of each DC/DC converter 149 can be done in real time, thereby reducing or eliminating output ripple, flickering, and/or other similar adverse effects that can be caused in the light load 142 (and/or any other type of load being served) due to deterioration of a DC/DC converter 149 and/or reconfiguring the switches 170.

Each switch 170 can be any type of device that changes state or position (e.g., opens, closes) based on certain conditions. Examples of a switch 170 can include, but are not limited to, a transistor, a dipole switch, a relay contact, a resistor, and a NOR gate. In certain example embodiments, each switch 170 can operate (e.g., change from a closed position to an open position, change from an open position to a closed position) based on input from the controller 104.

As stated above, the light fixture 102 can be placed in any of a number of environments. In such a case, the housing 103 of the light fixture 102 can be configured to comply with applicable standards for any of a number of environments. For example, the light fixture 102 can be rated as a Division 1 or a Division 2 enclosure under NEC standards. Similarly, any of the sensors 160 or other devices communicably coupled to the light fixture 102 can be configured to comply with applicable standards for any of a number of environments. For example, a sensor 160 can be rated as a Division 1 or a Division 2 enclosure under NEC standards.

Figure 2:
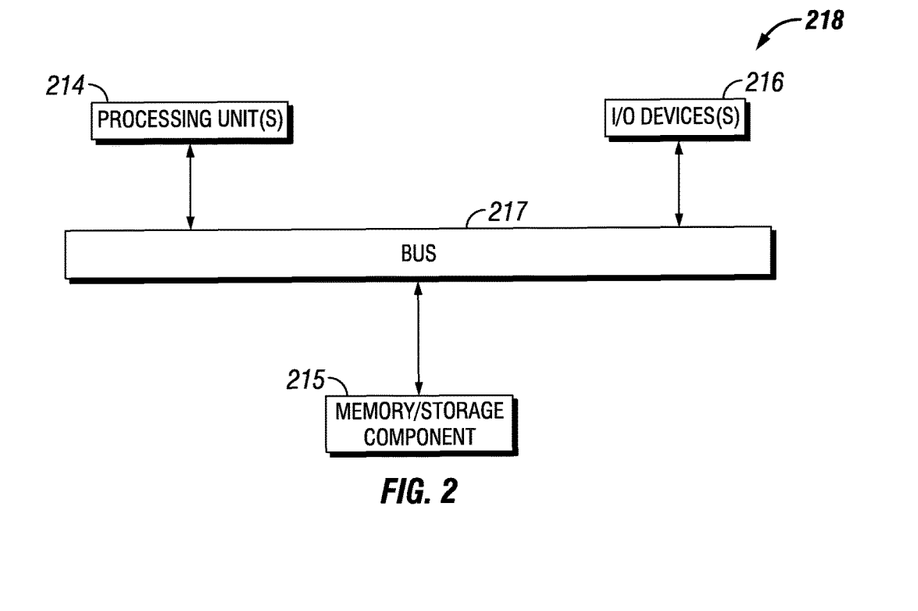
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
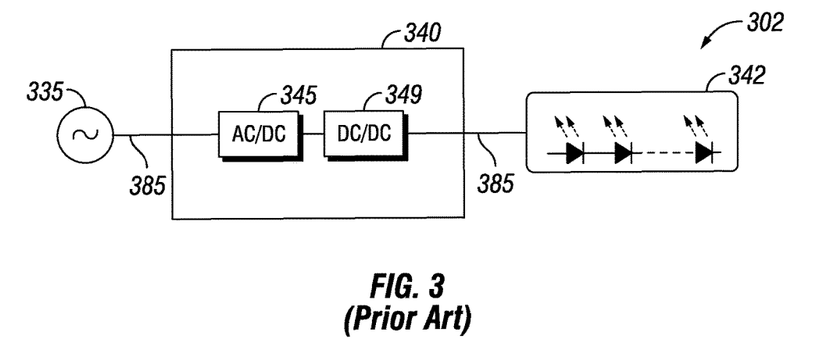
FIG. 3 shows a single line diagram of a light fixture currently known in the art.

FIG. 3 shows a single line diagram of a light fixture 302 currently known in the art. In this case, the light fixture 302 includes an external power source 335 (e.g., a wall outlet, AC mains), a power supply 340, and a light load 342. The power source 335 provides power to the power supply 340 using one or more power transfer links 385. The power supply 340 includes an AC/DC converter 345, which receives the power from the power supply 340 and converts the power from AC to DC. The AC/DC converter 345 then sends the DC power to the DC/DC converter 349 of the power supply 340. The DC/DC converter 349 takes the DC power from the AC/DC converter 345 and changes it to a different level of DC power. The output of the DC/DC converter 349 is sent to the light load 342 using one or more power transfer links 385.

Figure 4:
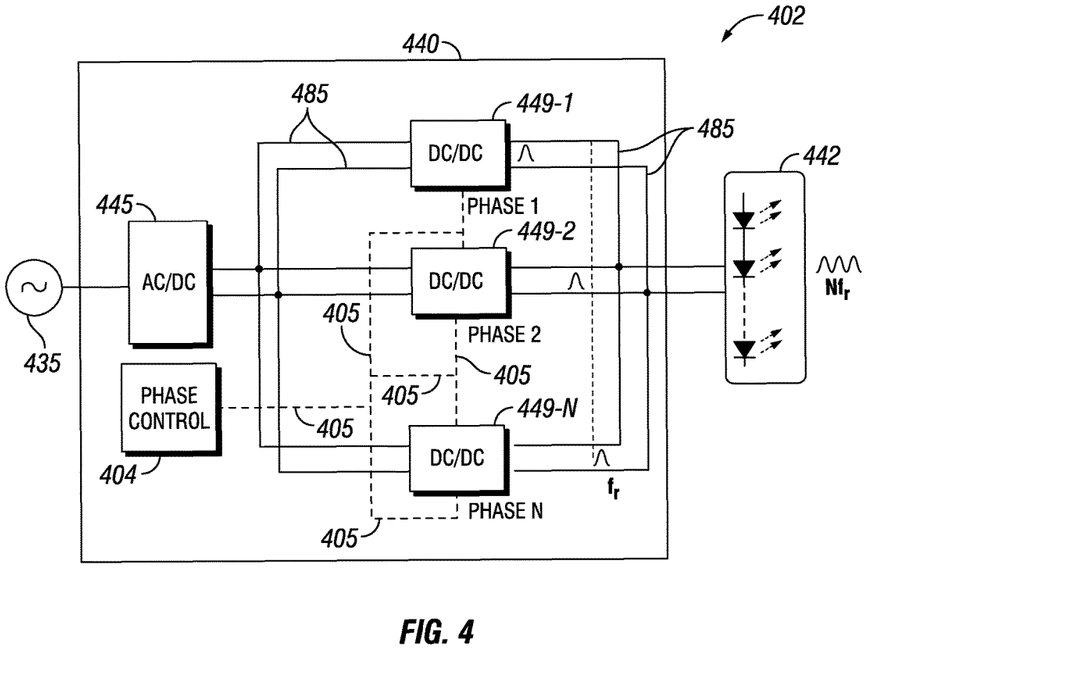
FIG. 4 shows a single line diagram of a light fixture in accordance with certain example embodiments.

FIG. 4 shows a single line diagram of a light fixture 402 in accordance with certain example embodiments. The light fixture 402 of FIG. 4 is substantially the same as the light fixture 302 of FIG. 3, except as described below. Specifically, the power supply 440 of FIG. 4 includes multiple DC/DC converters 449 that are fed from a single AC/DC converter 445 using a number of power transfer links 485. In this case, there are three DC/DC converters 449 (DC/DC converter 449-1, DC/DC converter 449-2, and DC/DC converter 449-N). The controller 404 is coupled to each of the DC/DC converters 449 using one or more signal transfer links 405.

In this way, the controller 404 can enable (allow power to be received from the AC/DC converter 445) one of the DC/DC converters 449 (e.g., DC/DC converter 449-1) while disabling (preventing power to be received from the AC/DC converter 445) the other DC/DC converters 449 (e.g., DC/DC converter 449-2, DC/DC converter 449-N) for some period of time (e.g., a third of a cycle, one cycle, five minutes). The controller 404 can enable and disable the DC/DC converters 449 using one or more switches (not shown), similar to the switches 170 described above with respect to FIG. 1A. In addition, or in the alternative, the controller 404 can enable and disable the DC/DC converters 449 using one or more algorithms (e.g., algorithms 133).

If switches are used to enable and disable the DC/DC converters 449, the switches can be located at any point within the power supply 440. For example, the switches can be put in line with one or more of the power transfer links 485. As another example, if the AC/DC converter 445 has multiple output channels, the switches can be integrated with the AC/DC converter 445 to determine which output channel is enabled and which output channels are disabled. As yet another example, the switches can be integrated with an input channel of each of the DC/DC converters 449.

In certain example embodiments, one or more of the DC/DC converters 449 in an example power supply 440 can include a filter capacitor. Further, the DC/DC converters 449 of the power supply 440 are arranged in this example in parallel to each other and in series with the AC/DC converter 440.

Figure 5A:
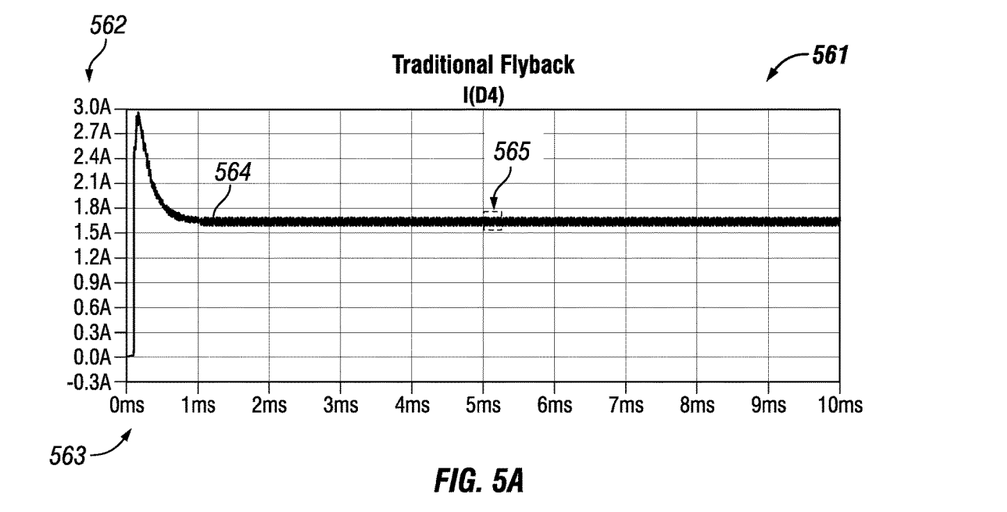
FIGS. 5A-5D show graphs that compare flyback current of a power supply currently used in the art with an example power supply.
Figure 5B:
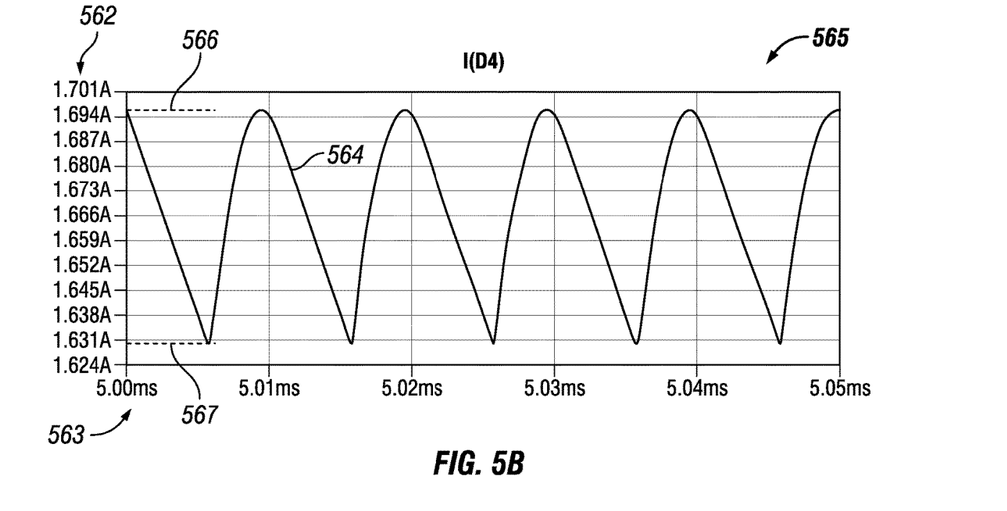
Figure 5C:
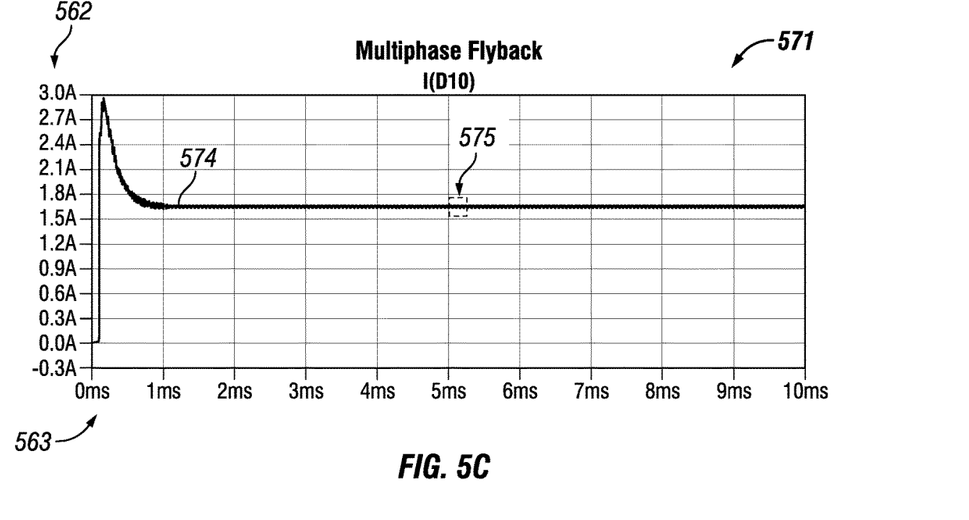
Figure 5D:
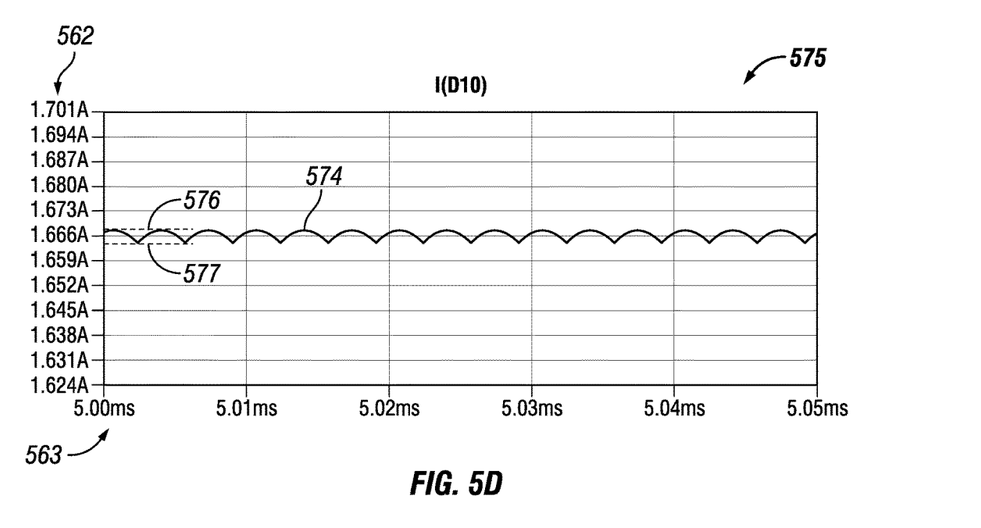

FIGS. 5A-5D show graphs that compare flyback current of a power supply currently used in the art with an example power supply. Specifically, FIG. 5A shows a graph 561 of a traditional flyback (using, for example, the power supply 340 of FIG. 3). FIG. 5B shows a graph 565 of a detail of the plot 564 of the graph 561 of FIG. 5A. FIG. 5C shows a graph 571 of a multi-phase flyback (using, for example, the example power supply 440 of FIG. 4). FIG. 5D shows a graph 575 of a detail of the plot 574 of the graph 571 of FIG. 5C.

Referring to FIGS. 1A-5D, flyback current corresponds to the sudden voltage spike that occurs across an inductive load (e.g., a light load 442) when its supply current is suddenly reduced or interrupted. One of the benefits of example embodiments described herein is the reduction in flyback current. In both cases of this example, the voltage provided by the AC/DC converter to the DC/DC converter(s) is 120 VDC, and the output of the DC/DC converter(s) is 35.12V/ 1.67 A. In addition, a filter capacitor having a capacitance of 47 µF is included with the DC/DC converter (e.g., DC/DC converter 349) of the traditional system of FIGS. 5A and 5B and with each DC/DC converter (e.g., DC/DC converter 449-1, DC/DC converter 449-N) of the example system of FIGS. 5C and 5D.

Each of the graphs shown in FIGS. 5A-5D have current 562 (in Amps) along the vertical axis and time 563 (in milliseconds) along the horizontal axis. The plot 564 of FIGS. 5A and 5B show that, in steady state, a current ripple is formed in a regular pattern between current 567 (approximately 1.629 A) and current 566 (approximately 1.697 A). The current ripple, shown in detail in the graph 565 of FIG. 5B, has a frequency of approximately 100 kHz and an amplitude of approximately 68 mA, which amounts to about 4% of the average current (approximately 1.665 A).

By contrast, the plot 574 of FIGS. 5C and 5D show that, in steady state, a current ripple is formed in a regular pattern between current 577 (approximately 1.663 A) and current 576 (approximately 1.667 A). The current ripple, shown in detail in the graph 575 of FIG. 5D, has a frequency of approximately 303 kHz and an amplitude of approximately 3.6 mA, which amounts to about 0.2% of the average current (approximately 1.665 A). Thus, example embodiments drastically reduce the ripple current, and so greatly minimize the harmful and undesired effects of the ripple current.

Figure 6A:
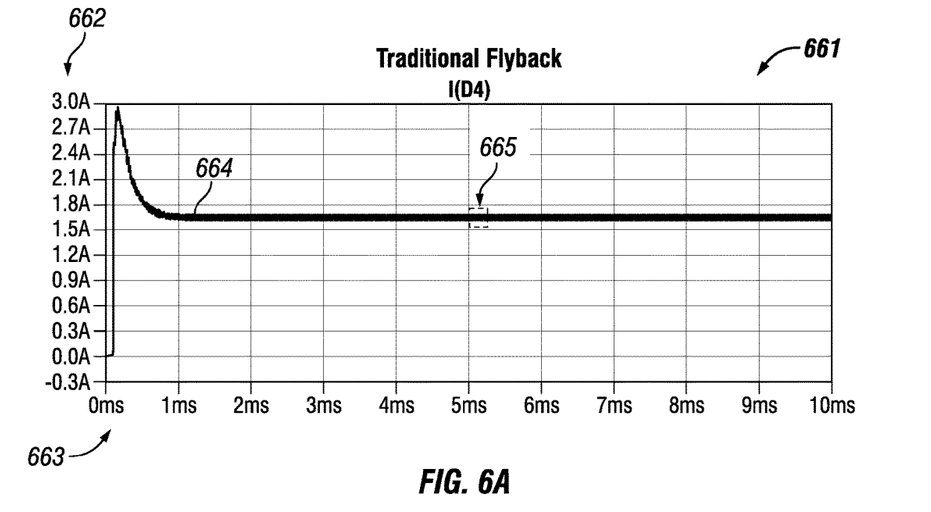
FIGS. 6A-6D show additional graphs that compare flyback current of a power supply currently used in the art with an example power supply.
Figure 6B:
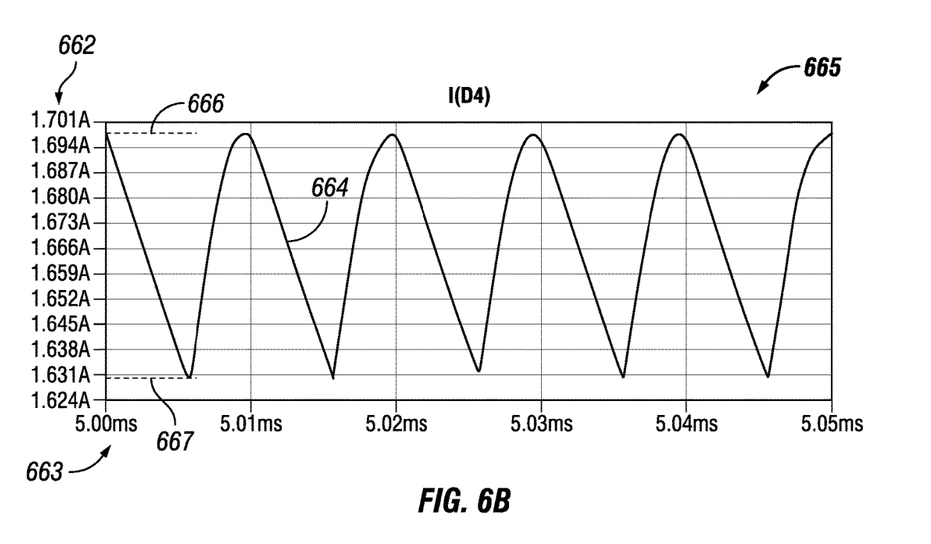
Figure 6C:
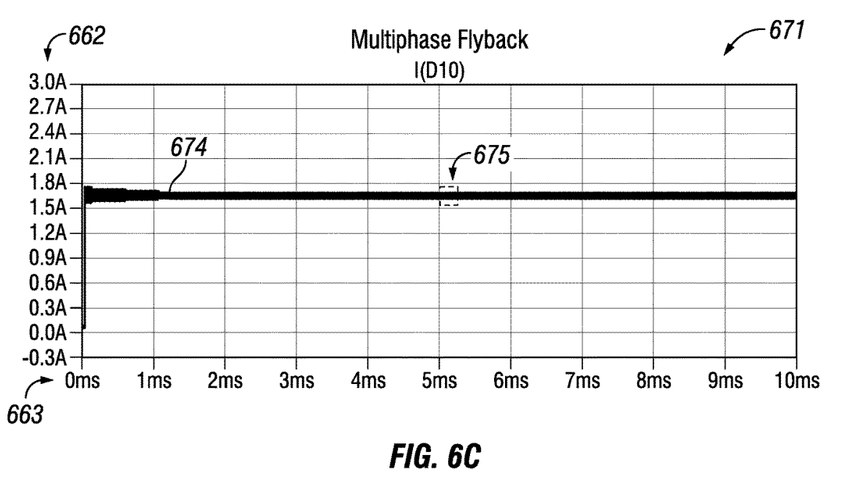
Figure 6D:
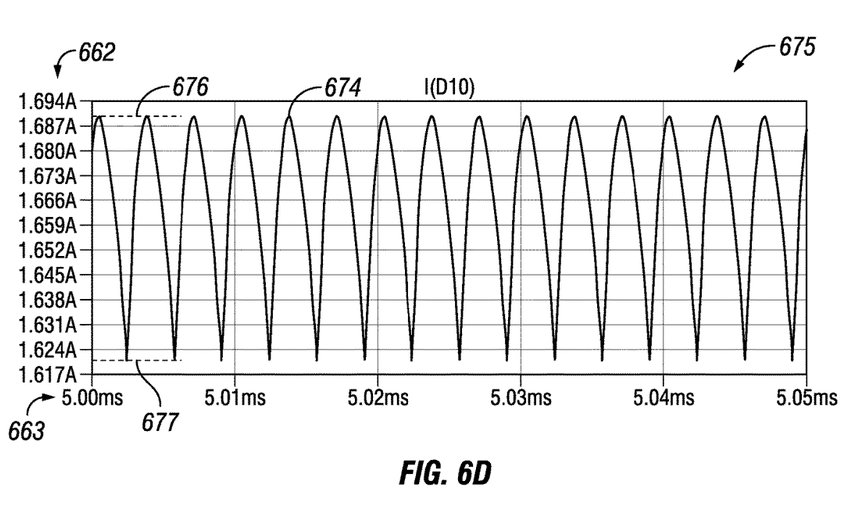

FIGS. 6A-6D show additional graphs that compare flyback current of a power supply currently used in the art with an example power supply. Specifically, FIG. 6A shows a graph 661 of a traditional flyback (using, for example, the power supply 340 of FIG. 3). FIG. 6B shows a graph 665 of a detail of the plot 664 of the graph 661 of FIG. 6A. FIG. 6C shows a graph 671 of a multi-phase flyback (using, for example, the example power supply 440 of FIG. 4). FIG. 6D shows a graph 675 of a detail of the plot 674 of the graph 671 of FIG. 6C.

Referring to FIGS. 1A-6D, in both cases of this example, the voltage provided by the AC/DC converter to the DC/DC converter(s) is 120 VDC, and the output of the DC/DC converter(s) is 35.12V/1.67 A. As for the filter capacitor, a filter capacitor having a capacitance of 47 µF is included with the DC/DC converter (e.g., DC/DC converter 349) of the traditional system of FIGS. 6A and 6B, while a filter capacitor having a capacitance of 7.2 µF is included with each DC/DC converter (e.g., DC/DC converter 449-1, DC/DC converter 449-N) of the example system of FIGS. 6C and 6D.

Each of the graphs shown in FIGS. 6A-6D have current 662 (in Amps) along the vertical axis and time 663 (in milliseconds) along the horizontal axis. The plot 664 of FIGS. 6A and 6B show that, in steady state, a current ripple is formed in a regular pattern between current 667 (approximately 1.629 A) and current 666 (approximately 1.697 A). The current ripple, shown in detail in the graph 665 of FIG. 6B, has a frequency of approximately 100 kHz and an amplitude of approximately 68 mA, which amounts to about 4% of the average current (approximately 1.665 A).

By contrast, the plot 674 of FIGS. 6C and 6D show that, in steady state, a current ripple is formed in a regular pattern between current 677 (approximately 1.629 A) and current 676 (approximately 1.697 A). The current ripple, shown in detail in the graph 675 of FIG. 6D, has a frequency of approximately 303 kHz and an amplitude of approximately 68 mA, which amounts to about 4% of the average current (approximately 1.665 A). In other words, by drastically reducing the size of each filter capacitor in each DC/DC converter of the example system, the magnitude of the ripple current is substantially the same as magnitude of the ripple current of currently-known systems using larger filter capacitors in the DC/DC converter. Thus, the DC/DC converters used in example embodiments can have reduced size (because of the smaller filter capacitor) and can be made at a reduced cost (again, because of the smaller filter capacitor).

Example embodiments can selectively enable and disable multiple DC/DC converters of a power supply to provide power to a light load in a lighting system. Example embodiments can be performed using a controller, which enables and disables the DC/DC converters in real time. The controller can enable and disable each DC/DC converter using one or more of a number of components (e.g., switches) and/or functions (e.g., algorithms). Example embodiments can be utilized to reduce the magnitude of ripple current, thus minimizing the undesired effects of the ripple current. In addition, or in the alternative, example embodiments can reduce the size and/or the cost of the DC/DC converters of a power supply. Further, example embodiments can improve the performance, efficiency, and useful life of a power supply. Example embodiments can provide for more consistent and long-standing light output from the light load in a lighting system. As a result, example embodiments can be used to improve the safety in the various environments (e.g., industrial) in which a light fixture is disposed. Example embodiments can also help ensure efficient allocation of maintenance resources within a facility. Example embodiments can further provide a user with options to prolong the useful life of a light fixture or components (e.g., power supplies) thereof.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical system, comprising:
    a power supply coupled to an electrical load, wherein the power supply comprises an AC/DC converter and a plurality of DC/DC converters, wherein the AC/DC converter provides raw DC power to the plurality of DC/DC converters, wherein the plurality of DC/DC converters receive the raw DC power and generate final DC power for the electrical load; and
    a controller coupled to the power supply, wherein the controller selectively enables and disables the plurality of DC/DC converters over time to regulate flyback current of the power supply.

2. The electrical system of claim 1, further comprising:
    at least one switch having an open position and a closed position, wherein the at least one switch is disposed in series with the plurality of DC/DC converters of the power supply, wherein the controller toggles the switch between the closed position and the open position, wherein a DC/DC converter of the plurality of DC/DC converters receives the raw DC power from the AC/DC converter when the at least one switch is in the closed position, and wherein the DC/DC converter of the plurality of DC/DC converters fails to receive the raw DC power from the AC/DC converter when the at least one switch is in the open position.

3. The electrical system of claim 2, wherein at least one switch is used to substantially evenly distribute the final DC power among the electrical load, where the at least one switch is configured based on availability of each of the plurality of DC/DC converters.

4. The electrical system of claim 2, wherein the controller is further configured to adjust an output of the plurality of DC/DC converters so that an amount of the final DC power delivered to the electrical load is substantially constant regardless of how the at least one switch is configured over time.

5. The electrical system of claim 1, wherein at least one of the plurality of DC/DC converters receives the raw DC power from the AC/DC converter at any point in time.

6. The electrical system of claim 5, wherein the electrical load continually receives the final DC power from the plurality of DC/DC converters.

7. The electrical system of claim 1, wherein each of the plurality of DC/DC converters are modules in the power supply.

8. The electrical system of claim 1, wherein the electrical load comprises a light load.

9. The electrical system of claim 1, wherein the controller comprises a hardware processor and a plurality of instructions stored in memory, wherein the plurality of instructions are executed on the hardware processor.

10. The electrical system of claim 1, wherein the controller identifies a failed DC/DC converter among the plurality of DC/DC converters, wherein the controller electrically isolates the failed DC/DC converter.

11. The electrical system of claim 1, wherein the controller minimizes an amplitude of a ripple current generated by the plurality of DC/DC converters.

12. A power supply for an electrical load, wherein the power supply comprises:
an AC/DC converter that receives AC power from a power source and converts the AC power to raw DC power;
at least one switch coupled to the AC/DC converter, wherein the at least one switch is operated by a controller, and wherein the at least one switch has a plurality of configurations; and
a plurality of DC/DC converters coupled in series with the at least one switch and in series with the electrical load,
wherein the AC/DC converter provides the raw DC power to a first DC/DC converter of the plurality of DC/DC converters at a first time when the at least one switch is in a first configuration of the plurality of configurations, wherein the first DC/DC converter uses the raw DC power to deliver first final DC power to the electrical load,
wherein the AC/DC converter provides the raw DC power to a second DC/DC converter of the plurality of DC/DC converters at a second time when the at least one switch is in a second configuration of the plurality of configurations, wherein the second DC/DC converter uses the raw DC power to deliver second final DC power to the electrical load.

13. The power supply of claim 12, wherein the first configuration of the at least one switch disables at least one other DC/DC converter of the plurality of DC/DC converters when the first DC/DC converter receives the raw DC power.

14. The power supply of claim 12, wherein a difference between the second time period and the first time period represents a phase shift.

15. The power supply of claim 14, wherein the difference is less than 0.01 milliseconds.

16. The power supply of claim 12, wherein the first DC/DC converter comprises a first filter capacitor having a capacitance.

17. The power supply of claim 16, wherein the second DC/DC converter comprises a second filter capacitor having the capacitance.

18. A method for providing DC power to an electrical load, wherein the method comprises:
receiving, by an AC/DC converter, AC power from a power source;
operating, by a controller at a first time, at least one switch to a first configuration, wherein the at least one switch is coupled to and positioned in series between the AC/DC converter and a plurality of DC/DC converters, wherein the first configuration of the at least one switch delivers raw DC power from the AC/DC converter to a first subset of DC/DC converters among the plurality of DC/DC converters at the first time period, wherein the first subset of DC/DC converters deliver first final DC power to the electrical load; and
operating, by the controller at a second time, the at least one switch to a second configuration, wherein the second configuration of the at least one switch delivers raw DC power from the AC/DC converter to a second subset of DC/DC converters among the plurality of DC/DC converters at the first time period, wherein the second subset of DC/DC converters deliver second final DC power to the electrical load.

19. The method of claim 18, further comprising:
evaluating the plurality of DC/DC converters prior to the first time;
determining, prior to the first time, that a failed DC/DC converter among the first subset of DC/DC converters has failed;
operating, by the controller at the first time, at least one switch to a third configuration, wherein the third configuration of the at least one switch delivers raw DC power from the AC/DC converter to a revised first subset of DC/DC converters, wherein the revised first subset of DC/DC converters excludes the failed DC/DC converter, wherein the revised first subset of DC/DC converters deliver first final DC power to the electrical load.

20. The method of claim 19, further comprising:
adjusting an output of each DC/DC converter of the revised first subset of DC/DC converters to compensate for the failed DC/DC converter.

* * * * *